United States Patent [19]

Audas et al.

[11] Patent Number: 5,225,921
[45] Date of Patent: Jul. 6, 1993

[54] METHOD OF OPERATING A LIQUID CRYSTAL LIGHT VALVE

[76] Inventors: Robert D. Audas, 250 Lester Street, Waterloo, Ontario, Canada, N2L 3W5; Donald E. Brodie, R.R. #3, Waterloo, Ontario, Canada, N2J 3Z4

[21] Appl. No.: 721,600
[22] PCT Filed: Jan. 26, 1990
[86] PCT No.: PCT/CA90/00024
§ 371 Date: Jul. 25, 1991
§ 102(e) Date: Jul. 25, 1991
[87] PCT Pub. No.: WO90/08972
PCT Pub. Date: Aug. 9, 1990

[30] Foreign Application Priority Data

Jan. 26, 1989 [GB] United Kingdom .............. 8901666.1

[51] Int. Cl.$^5$ .................................................. G02F 1/13
[52] U.S. Cl. .......................................... 359/84; 359/45; 359/71; 359/72
[58] Field of Search .................. 359/45, 71, 72, 67, 359/84

[56] References Cited

U.S. PATENT DOCUMENTS

| | | | |
|---|---|---|---|
| 3,976,361 | 8/1976 | Fraas et al. | 359/72 |
| 4,114,991 | 9/1978 | Bleha, Jr. et al. | 359/72 |
| 4,672,014 | 6/1987 | Joiner et al. | 359/72 |
| 4,941,735 | 7/1990 | Moddel et al. | 359/72 |
| 5,046,828 | 9/1991 | Takanashi et al. | 359/72 |
| 5,084,777 | 1/1992 | Slobodin | 359/72 |

Primary Examiner—William L. Sikes
Assistant Examiner—Huy K. Mai
Attorney, Agent, or Firm—Daryl W. Schnurr

[57] ABSTRACT

A method of operating a liquid crystal light valve having a photoconductor and a liquid crystal involves selecting a photoconductor with an appropriate bandgap and an input light having a limited frequency range with a center frequency matching a bandgap of the photoconductor. This results in the light being more uniformly absorbed through the bulk of the photoconductor and the light blocking layer or the light blocking layer and the mirror can be eliminated. The photoconductor can be optimized for sensitivity and short carrier lifetimes necessary for high frame rates.

11 Claims, 2 Drawing Sheets

METHOD OF OPERATING A LIQUID CRYSTAL LIGHT VALVE

BACKGROUND OF THE INVENTION

1. Field of the Invention

This invention relates to a method of operation of a liquid crystal light valve for use in large screen projection and the like.

2. Description of the Prior Art

Typically, a liquid crystal light valve is made up of several layers of material with a light blocking layer and a mirror located between a photoconductor and a liquid crystal. The light blocking layer is located between the photoconductor and the mirror. On what would otherwise be the outer surfaces of the photoconductor and the liquid crystal, there are located transparent contacts. On what would otherwise be the outer surfaces of the transparent contacts, there are located layers of glass that are optically correct.

Liquid crystal light valves are operated in a reflecting mode and a mirror is used to reflect the front illumination. Unfortunately, the mirror is not completely reflecting. As a result, some of the very high intensity light leaks through to the semiconductor and produces carriers. These carriers change the resistivity of the semiconductor. To prevent this change in resistivity, a light blocking layer is employed between the mirror and the semiconductor. The light blocking layer introduces extra resistance, capacitance and complexity to the device. Further, when liquid crystal light valves are used for large screen projection and similar applications, the photoconductor film must be fairly thick (usually greater than five micrometers) to reduce the capacitance of the film layer and to provide a sufficiently large dark resistance. Capacitance is proportional to the inverse of the thickness. {See "1972 SID International Symposium Digest of Technical Papers", June 1972, pages 70–71 (D1); U.S. Pat. No. 4,037,932 (D2); and "Nouvelle Revue D'Optique appliqeé", July/August 1971, vol. 2, no. 4, pages 221-228 (D3)}

When light is shone on the back surface of the photoconductor, most of the light is absorbed in the first few hundred nanometers or less (see the lower curve in FIG. 1). The carriers produced by this light remain near the surface of the photoconductor and produce a very small change in the overall resistance of the photoconducting layer and therefore a very small change in the signal to the liquid crystal (i.e. low sensitivity).

Several methods have been advanced to move the carriers into the bulk of the photoconductor by applying internal or external electric fields. An AC field must be applied to the liquid crystal in order to prevent the transparent contacts from being electrochemically removed and the photoconductor must have both carrier types active. If the photoconductor is unipolar, then the carriers are swept into the bulk of the semiconductor for one bias polarity and held at the surface for the other bias polarity. In other words, the unipolar photoconductor only works properly for one bias polarity. Another problem that arises from sweeping the carriers from the surface into the bulk of the photoconductor is that the semiconductor or photoconductor must be optimized for long carrier lifetimes to allow enough time for the carriers to be swept through the bulk of the semiconductor or photoconductor. This can place severe restrictions on the frame rates which can be achieved.

SUMMARY OF THE INVENTION

It is an object of the present invention to provide a method of operating a liquid crystal light valve having a photoconductor and a liquid crystal by causing the carriers to be created throughout a bulk of the photoconductor without the use of electric fields.

A method of operating a liquid crystal light valve where said valve has a photoconductor and a liquid crystal, a light input into the photoconductor and a light output from the liquid crystal is characterized by selecting a photoconductor with an appropriate bandgap and an input signal of a specific narrow band of wavelengths such that a center frequency of the input light substantially matches the bandgap of the photoconductor. As a result, light energy creates carriers through the entire photoconductor, thereby producing a change in resistivity throughout the entire photoconductor and not just at a surface thereof.

A method of operating a liquid crystal light valve where said valve has a photoconductor and a liquid crystal located between two transparent conducting electrodes with an implied bias voltage, said valve being used with an input light in order to generate an output light, a light input into the photoconductor and a light output from the liquid crystal is characterized by selecting an input signal light of a specific narrow band of wavelengths such that a center frequency of the input signal light substantially matches a bandgap of the photoconductor whereby light energy is absorbed and generates carriers through the entire photoconductor, thereby producing a change in resistivity throughout the entire photoconductor and not just the surface thereof, arranging the input signal light to control the output light which is transmitted through and controlled by the liquid crystal.

DESCRIPTION OF A PREFERRED EMBODIMENT

If a photon energy of light which strikes a photoconductor is less than the energy of the bandgap, then this light is very weakly absorbed by the photoconductor and there are few carriers produced. In a colour or black and white projector, the bandgap of the photoconductor may be chosen to be higher than a front illumination photon energy. For example, zinc oxide, titanium dioxide, strontium titanate, amorphous silicon nitride or boron phosphide all have bandgaps above the necessary visible spectrum. In these circumstances, the light which passes through the mirror is not absorbed by the photoconductor and thereby the necessity for a light blocking layer is eliminated. For a blue front illumination liquid crystal light valve, the photoconductor may be chosen with a very low bandgap. The light which leaks through from the front will then be absorbed at the surface near the mirror. The carriers produced by this light will be localized in a thin layer near the mirror, which will cause a very small change in the total resistivity of the photoconductor.

It has been discovered that a liquid crystal light valve having a photoconductor and a liquid crystal with a light input into the photoconductor and a light output from the liquid crystal can be operated by selecting a photoconductor with an appropriate bandgap and an input signal light of a specific narrow band of wavelengths such that a center frequency of the input light substantially matches the bandgap of the photoconductor. This results in light energy being absorbed through the entire photoconductor, thereby producing a change in resistivity throughout the entire photoconductor and not just at the surface thereof. The narrow band spectrum of input light is centered energetically near and overlaps the bandgap of the photoconductor. The wavelength of the light is chosen such that the absorption coefficient is small for about half of the bandwidth of the spectrum. This means that the light will not be totally absorbed at the surface but will produce carriers throughout the bulk of the photoconductor. If the spectrum is chosen properly, then some of the light will reflect off the mirror, if a mirror is present in the light valve, and produce an even more uniform carrier density throughout a photoconductor thickness.

Figure 1:
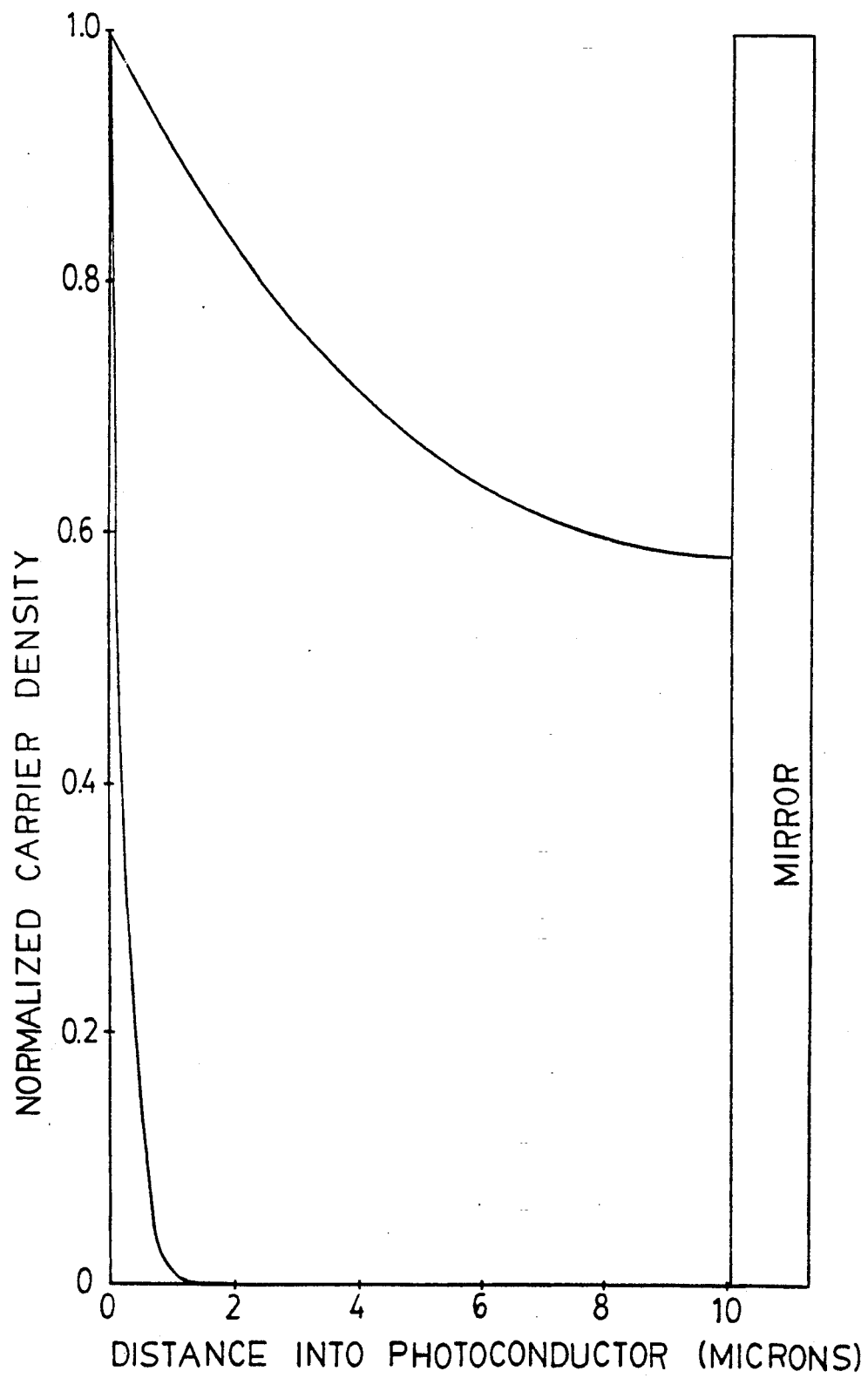
FIG. 1 is a graph showing the carrier density profile for two distinct circumstances.

In FIG. 1, a top curve represents a carefully chosen absorption coefficient which produces a fairly uniform carrier density throughout the photoconductor or film. This top curve allows for the fact that some of the light reflected by the mirror produces carriers during the second pass through the photoconductor. It is not necessary to sweep the carriers in or out of the photoconductor and the photoconductor may be unipolar or ambipolar. Further, the carrier lifetime may be very short, thereby enhancing the frame rate, since the carriers need not be moved to other parts of the photoconductor.

In both unipolar and ambipolar photoconductors, the change in conductivity caused by the illumination is proportional to the number of carriers produced by the absorption of photons. This generation of carriers is proportional to the intensity of the illumination. In FIG. 1, the lower curve represents the normalized carrier density (prior art) for the case where the light is absorbed in the first few hundred nanometers of the photoconductor. The change in resistance of the photoconductor at a given point is proportional to the height of the curve.

The photoconductivity for a photoconductor ($\Delta\sigma_p$) is given by:

$$\Delta\sigma_p = eg(\mu_n t_n + \mu_p t_p) \tag{1}$$

Where e is the electronic charge, g is the generation rate, $\mu_n$ and $\mu_p$ are the electron and hole mobilities respectively and $t_n$ and $t_p$ are the electron and hole lifetimes respectively. If the photoconductor is unipolar (electrons dominate) then:

$$\mu_n t_n > \mu_p t_p \tag{2}$$

and $$\Delta\sigma_p \approx eg\, \mu_n t_n \tag{3}$$

One can select the $t_n$ over a wide range in many photoconductors by controlling the nature and density of the recombination centers present.

The gain (G) of the photoconductor is given by:

$$G = (\mu_n t_n \epsilon)/L = t_n/t_d \tag{4}$$

Where $\epsilon$ is the electric field in the photoconductor, L is the dimension of the photoconductor in the direction parallel to the electric field and $t_d$ is the transit time for a carrier across the photoconductor.

The L dimension should be small to increase the photoconductor gain but a limit is placed on this parameter since it must be large to reduce capacitance and increase dark resistance. The size of the electric field is governed by the requirements of the liquid crystal and the resistance of the photoconductor layer.

Figure 2:
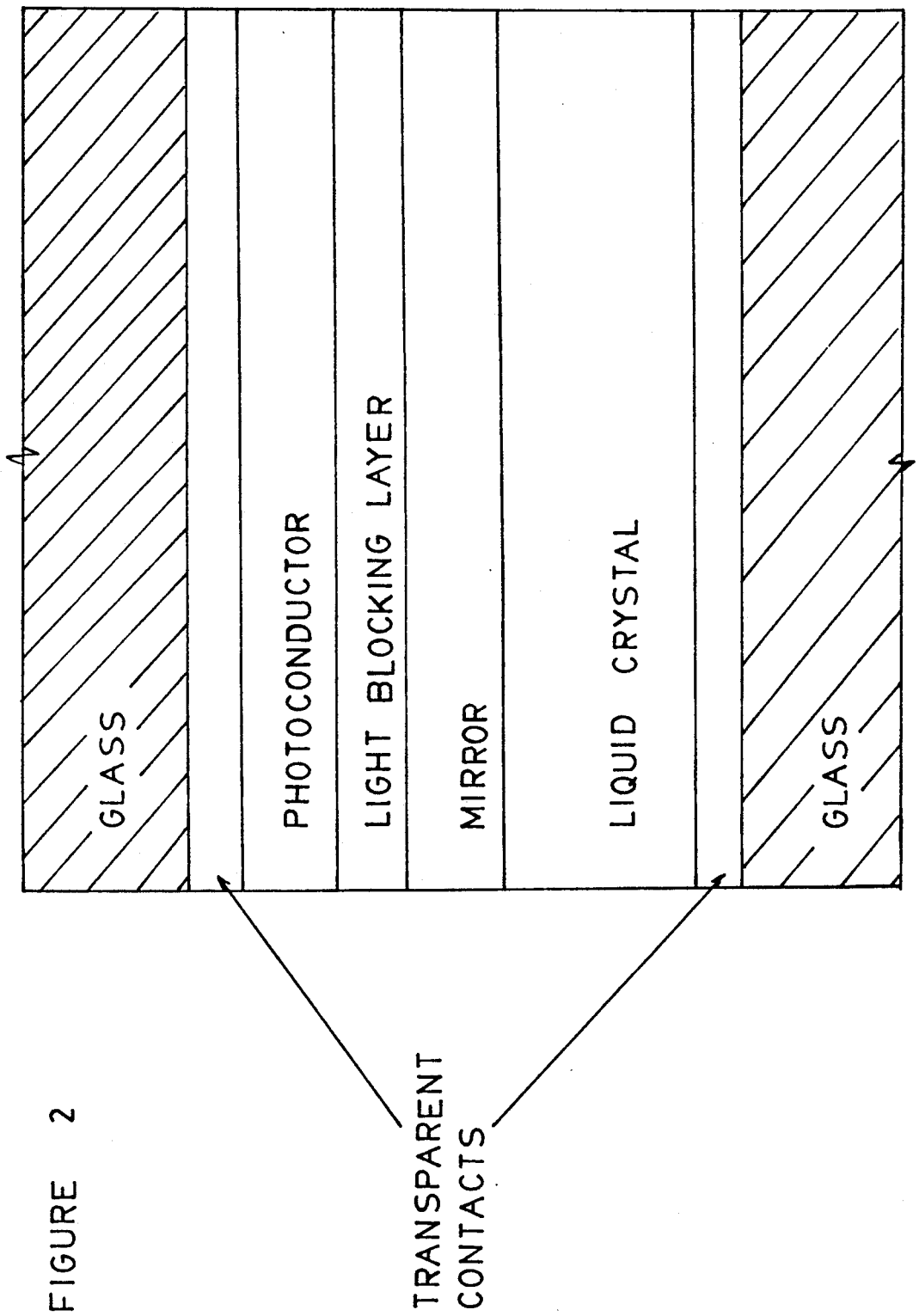
FIG. 2 is a schematic sectional view of a liquid crystal light valve.

The light valve in FIG. 2 is operated in accordance with the present invention using transmitted light and selecting a photoconductor having a bandgap matching a shorter wavelength, the photoconductor being insensitive to a spectrum of the transmitted light, thereby producing output light from the liquid crystal of high light intensity.

By operating a light valve in accordance with the present invention, the mirror and the light blocking layer can be completely eliminated from the light valve in some circumstances. In other circumstances, the light blocking layer is eliminated while still utilizing the mirror between the photoconductor and the liquid crystal.

Where the light valve has a photoconductor, a mirror and a liquid crystal, the light valve can be operated using both transmitted and reflected light. The light output from the crystal reflects from the mirror and returns through the liquid crystal. A photoconductor is selected having a bandgap matching a longer wavelength than the output light so that the output light which leaks through the mirror is strongly absorbed in the surface of the photoconductor and does not significantly affect the overall photoconductor resistance.

Further, a photoconductor can be selected with a significantly increased thickness, thereby decreasing the capacity of the photoconductor. The photoconductor is also selected to have an increased sensitivity to the input light, thereby improving the impedance match to the rest of the liquid crystal light valve resulting in an increase in an AC frequency of a driving bias voltage at which the light valve is operated.

The present invention enables a light valve to be designed with a photoconductor of the correct bandgap and short carrier lifetime to optimize the sensitivity and frequency response, the light valve being illuminated with a limited frequency range image having a center frequency matching the bandgap of the photoconductor. The low absorption coefficient for light, with photon energies which just encompass or are near the photoconductor bandgap, ensures that the light will be absorbed more uniformly throughout most of the thickness of the photoconductor, possibly even a double pass through the material (being reflected by the back surface of the mirror). When the photoconductor is optimized for sensitivity and short carrier lifetimes, higher frame rates can be achieved.

The use of a photoconductor with a bandgap energy greater than that of the monochromatic (or narrow band) front illuminating photon energies for colour images (or white light to give a black and white picture) means that the light leaking through the mirror will produce few if any carriers in the photoconductor. The photoconductor may be chosen with a bandgap smaller than the front illumination photon energy, which allows the absorption of the leaked light to occur only in the surface of the photoconductor where it produces a very small change in the total photoconductor resistance. Either of these two techniques eliminates or reduces the necessity of a light blocking layer. The light blocking layer may be eliminated completely to permit transparent operation of the device (i.e. image transmission through the light valve). An anti-reflective coating, which is easy to optimize for the essentially monochromatic light, may be placed on the photoconductor side of the cell to help improve sensitivity. The light valve can also be operated by eliminating both the mirror and the light blocking layer. Increased frame speed can be achieved when the light blocking layer alone is eliminated or both the light blocking layer and the mirror are eliminated. Also, the removing of the light blocking layer allows for simpler fabrication of the light valve and removes a layer which would add resistance and series capacitance, with no conducting gain. The mirror can then be made less efficient to achieve the same result.

The photoconductor component can be of a simple homogeneous material. A transmission liquid crystal light valve can be produced through the use of an ultraviolet sensitive photoconductor. The mirror specifications may be reduced because some light transmission through the mirror can be permitted. The photoconductor has good noise rejection because it is sensitive to a restricted spectrum of light. Photoconductors can be selected to accommodate any desirable wavelength that may be advantageous for the input signal and optical impedance matching layers on the transparent front contact can be used to increase sensitivity. Numerous other advantages will be readily apparent to those skilled in the art.

What we claim as our invention is

1. A method of forming a liquid crystal light valve, said valve having a photoconductor and a liquid crystal, located between two transparent conducting electrodes with an applied bias voltage, said valve being used with an input light in order to generate an output light, said method being characterized by selecting a photoconductor with an appropriate bandgap and selecting an input signal light of a specific narrow band of wavelengths such that a center frequency of the input signal light substantially matches the bandgap of the photoconductor whereby light energy is absorbed and generates carriers through the entire photoconductor, thereby producing a change in resistivity throughout the entire photoconductor and not just at a surface thereof, arranging the input signal light to control the output light which is transmitted through and controlled by the liquid crystal.

2. A method as claimed in claim 1 characterized by including the step of selecting an input light having a center frequency that overlaps the bandgap of the photoconductor.

3. A method as claimed in any one of claims 1 or 2 characterized by including the steps of operating the light valve using transmitted light, selecting a photoconductor having a bandgap matching a shorter wavelength, said photoconductor being insensitive to a spectrum of the transmitted light, thereby producing output light from the liquid crystal of high light intensity.

4. A method as claimed in any one of claims 1 or 2 characterized by including the steps of operating the light valve using both transmitted and reflected light, said light valve having a photoconductor, a mirror and a liquid crystal, with the light output from the crystal reflecting from the mirror and returning through the liquid crystal, selecting a photoconductor having a bandgap matching a longer wavelength than the output light so that output light which leaks through the mirror is strongly absorbed in the surface of the photoconductor and does not significantly affect the overall photoconductor resistance.

5. A method as claimed in any one of claims 1 or 2 characterized by selecting the photoconductor from the group of zinc oxide, titanium dioxide, strontium titanate, amorphous silicon nitride and boron phosphide.

6. A method of operating a liquid crystal light valve, said valve having a photoconductor and a liquid crystal, said method being characterized by selecting a photoconductor with an appropriate bandgap and an input signal light of a specific narrow band of wavelengths such that a center frequency of the input signal light substantially matches the bandgap of the photoconductor whereby light energy is absorbed through the entire photoconductor, thereby producing a change in resistivity throughout the entire photoconductor and not just at a surface thereof, arranging the input signal light to cause light to enter the photoconductor and to be emitted from the liquid crystal.

7. A method of operating a liquid crystal light valve, said valve having a photoconductor and a liquid crystal, located between two transparent conducting electrodes with an implied bias voltage, said photoconductor having a bandgap, said valve being used with an input light in order to generate an output light, said method being characterized by selecting an input signal light of a specific narrow band of wavelengths such that a center frequency of the input signal light substantially matches the bandgap of the photoconductor whereby light energy is absorbed and generates carriers through the entire photoconductor, thereby producing a change in resistivity throughout the entire photoconductor and not just at a surface thereof, arranging the input signal light to control the output light which is transmitted through and controlled by the liquid crystal.

8. A method as claimed in claim 7 characterized by including the step of selecting an input light having a center frequency that overlaps the bandgap of the photoconductor.

9. A method ad claimed in claim 7 characterized by including the steps of operating the light valve using transmitted light, selecting a photoconductor having a bandgap matching a shorter wavelength, said photoconductor being insensitive to a spectrum of the transmitted light, thereby producing output light from the liquid crystal of high light intensity.

10. A method as claimed in claim 7 characterized by including the steps of operating the light valve using both transmitted and reflected light, said light valve having a photoconductor, a mirror and a liquid crystal, with the light output from the crystal reflecting from the mirror and returning through the liquid crystal, selecting a photoconductor having a bandgap matching a longer wavelength than the output light so that output light which leaks through the mirror is strongly absorbed in the surface of the photoconductor and does not significantly affect the overall photoconductor resistance.

11. A method as claimed in any one of claims 7 or 8 characterized by selecting the photoconductor from the group of zinc oxide, titanium dioxide, strontium titanate, amorphous silicon nitride and boron phosphide.

* * * * *